United States Patent
Xi et al.

(10) Patent No.: US 12,486,362 B2
(45) Date of Patent: Dec. 2, 2025

(54) POLYESTER POLYOL COMPRISING AN IMIDE MOIETY AND METHODS OF MANUFACTURE THEREOF

(71) Applicant: Huntsman International LLC, The Woodlands, TX (US)

(72) Inventors: Kai Xi, The Woodlands, TX (US); David J. Shieh, The Woodlands, TX (US); Lifeng Wu, The Woodlands, TX (US); Sachchida Singh, The Woodlands, TX (US)

(73) Assignee: HUNTSMAN INTERNATIONAL LLC

( * ) Notice: Subject to any disclaimer, the term of this patent is extended or adjusted under 35 U.S.C. 154(b) by 845 days.

(21) Appl. No.: 17/631,707

(22) PCT Filed: Aug. 5, 2020

(86) PCT No.: PCT/US2020/045017
§ 371 (c)(1),
(2) Date: Jan. 31, 2022

(87) PCT Pub. No.: WO2021/030117
PCT Pub. Date: Feb. 18, 2021

(65) Prior Publication Data
US 2022/0315705 A1    Oct. 6, 2022

Related U.S. Application Data

(60) Provisional application No. 62/884,852, filed on Aug. 9, 2019.

(51) Int. Cl.
*C08G 73/16*    (2006.01)
(52) U.S. Cl.
CPC .......... *C08G 73/16* (2013.01); *C08G 2110/00* (2021.01)
(58) Field of Classification Search
CPC ........ C08G 73/16; C08L 79/08; C09D 179/08
See application file for complete search history.

(56) References Cited

U.S. PATENT DOCUMENTS

| | | | |
|---|---|---|---|
| 4,116,941 A | 9/1978 | Hanson | |
| 9,598,548 B2 | 3/2017 | Mueller-Cristadoro et al. | |
| 2011/0187029 A1* | 8/2011 | Dietrich | ............... C08G 63/916 |
| | | | 525/130 |
| 2011/0237741 A1 | 9/2011 | Bleys et al. | |
| 2020/0299454 A1* | 9/2020 | Schedler | ............ C08G 63/6856 |

FOREIGN PATENT DOCUMENTS

| | | |
|---|---|---|
| CA | 1103841 A | 6/1981 |
| CN | 101514276 A | 8/2009 |
| DE | 0384505 B1 * | 4/1993 |
| GB | 1557850 A | 12/1979 |
| JP | 2010-070698 A | 4/2010 |
| JP | 2012164424 A | 8/2012 |
| KR | 20160091026 A | 8/2016 |
| WO | 2004/083274 A1 | 9/2004 |
| WO | 2018/132792 A1 | 7/2018 |
| WO | 2019/105935 A1 | 6/2019 |

OTHER PUBLICATIONS

Chinese Office Action issued Jul. 20, 2023 for Corresponding Application No. 202080060770.9.
Brazilian Preliminary Office Action issued Oct. 23, 2023, in corresponding Brazilian Application No. BR 11 2022 001647 6 (English translation enclosed herewith).
Office Action received in corresponding Indian Application No. 202247006415 issued Mar. 1, 2024.
International Search Report and Written Opinion received in corresponding PCT Application No. PCT/US2020/045017 completed Oct. 19, 2020 and mailed Nov. 5, 2020.
Office Action received in corresponding Chinese Application No. 202080060770.9 issued Feb. 7, 2024.
Japanese Office Action issued Jul. 31, 2024, in corresponding Japanese Application No. 2022-507819 (English translation enclosed herewith).

* cited by examiner

*Primary Examiner* — Gregory Listvoyb

(57) ABSTRACT

A method of forming an aromatic polyester polyol compound comprising an imide moiety, wherein the method comprises reacting: (i) a cyclic anhydride compound; (ii) a phthalic acid based compound; (iii) a primary amine compound; and (iv) an aliphatic diol compound.

15 Claims, No Drawings

POLYESTER POLYOL COMPRISING AN IMIDE MOIETY AND METHODS OF MANUFACTURE THEREOF

CROSS-REFERENCE TO RELATED APPLICATIONS

This application is the National Phase of International Application PCT/us2020/045017 filed Aug. 5, 2020 which designated the U.S. and which claims priority to U.S. Provisional Application No. 62/884,852 filed Aug. 9, 2019. The noted applications are incorporated herein by reference.

BACKGROUND

Field

The present disclosure relates generally to a polyester polyol comprising an imide moiety and methods of manufacture thereof.

Background Information

Polyurethane ("PU") and polyisocyanurate ("PIR") based foam products are widely used in the building construction industry because of their superior sealing and insulative properties when compared to other building insulation solutions used in the industry.

Local building codes often dictate that materials used in the construction of a building, such as the PU and/or PIR based foam products, must pass certain flammability criteria before the products can be used in the construction of a building. Accordingly, formulators of these foam products often include fire retardant additives in the foam compositions to ensure that the final foam product passes the relevant building codes.

While use of a fire retardant additive in a foam composition is beneficial in most cases, there are inherent disadvantages with the use of such additives in the foam compositions. For example, use of a fire retardant additive can increase the overall cost of the composition thereby affecting the economic benefit of using PU and/or PIR foam product in the construction of a building. Additionally, adding fire retardant additives into a foam composition can cause storage and handling issues (e.g., uneven distribution or reactivity changes) that may deter a builder from using PU and/or PIR foam products in a building's construction.

Aromatic polyester polyols are also widely used in the manufacture of PU and/or PIR foams whenever the application requires high heat resistance and/or good flammability resistance. For example, PU and/or PIR foam insulation are used in various pipelines in the transport of oil, natural gas, and other petroleum products. In these applications, the PU and/or PIR foam must be able to operate at temperatures above 121° C. Such applications include the extraction of oil from deep wells, the transport of bitumen, and the transport of steam for injection into heavy oil wells. These applications often require the PU and/or PIR foam to operate continuously at operating temperatures exceeding 148.8° C. over extended periods of time (e.g., decades).

In some cases, PU and/or PIR foam insulated pipes are used to transport steam or hot water in district heating systems. In these applications, the PU and/or PIR foam must meet specific high temperature performance requirements. For example, PU and/or PIR foam insulated pipes used in the transport of steam or hot water in various district heating systems in the European Union must meet the EN253 standard. EN235 requires the pipe assembly to have a life of at least thirty years at a continuous operating temperature of 120° C.

Use of an aromatic polyester polyol having improved thermal stability to produce polyurethane and polyisocyanurate foam products has the potential to yield products with improved thermal resistance as well as improved flame retardant properties.

DETAILED DESCRIPTION

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

When referring to any numerical range of values, such ranges are understood to include each number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

Unless otherwise stated herein, reference to any compounds shall also include any isomers (e.g., stereoisomers) of such compounds.

As used herein, "liquid" means having a viscosity of less than 200 Pa·s. as measured according to ASTM D445-1 1a at 20° C.

Imide Moiety Containing Aromatic Polyol Compound

The aromatic polyester polyol compound comprising an imide moiety ("Imide Moiety Containing Aromatic Polyol Compound") used in the present disclosure is the reaction product of an aromatic polyester polyol composition comprising: (i) a cyclic anhydride compound; (ii) a phthalic acid based compound, (iii) a primary amine compound, (iv) an aliphatic diol; (v) optionally, a high functionality, low molecular weight polyether polyol compound; and (vi) optionally, a hydrophobic compound; wherein the weight ratio of Component (i) to Component (ii) is from 1:24 to 24:1. A detailed description of the various reactive components used to form the Imide Moiety Containing Aromatic Polyol Compound can be found below.

In some embodiments, the Imide Moiety Containing Aromatic Polyol Compound is formed by mixing Components (i)-(vi) and allowing one or more of the reactive ingredients to react. In some embodiments, the Imide Moiety Containing Aromatic Polyol Compound is synthesized using a single-pot (i.e., one pot synthesis) and not a multi-pot process.

One advantage of utilizing a single-pot synthesis process to manufacture the Imide Moiety Containing Aromatic Polyol Compound is that such a process can be readily adopted in an industrial manufacture setting. For instance, use of a single-pot synthesis process not only reduces the overall capital expense and equipment needed to manufacture the Imide Moiety Containing Aromatic Polyol Compound but it also reduces the total amount of space needed to manufacture the Imide Moiety Containing Aromatic Polyol.

Imide Moiety Containing Polyol Compound Characteristics

In some embodiments, the Imide Moiety Containing Polyol Compound of the present disclosure has an average hydroxyl functionality ranging from 1.3 to 4 (e.g., 1.5 to 3.5 or 1.8 to 3).

In some embodiments, the Imide Moiety Containing Polyol Compound has an average hydroxyl number value ranging from 30 to 600 mg of KOH/g (e.g., 50 to 500 mg of KOH/g or 100 to 450 mg of KOH/g') while considering the free glycols that may be present.

In some embodiments, the Imide Moiety Containing Polyol Compound has an acid number ranging from 0.5 to 5 mg of KOH/g (e.g., 0.5 to 2 mg of KOH/g).

In some embodiments, the Imide Moiety Containing Polyol Compound has a viscosity ranging from 200 to 150,000 centipoises (cps) (e.g., 1,000 to 100,000 cps or 1,500 to 50,000) at 25° C. as measured using a Brookfield viscometer.

It was surprisingly found that in some embodiments the thermal stability of the Imide Moiety Containing Polyol Compound as measured at 500° C. under anaerobic conditions and at 400° C. under aerobic conditions is at least 5% higher than the thermal stability of Conventional Aromatic Polyester Polyol Compounds (wherein thermal stability is measured as TGA using the method described in the "Polyol Thermal Stability Testing" of the Examples below). As used herein, "Conventional Aromatic Polyester Polyol Compounds" are aromatic polyester polyol compounds having the same hydroxyl number as the Imide Moiety Containing Polyol Compound and which were prepared using the same reactive ingredients (except for Components (i) and (iii)) and under the same reactive conditions as the Imide Moiety Containing Polyol Compound. For the purpose of clarity, the Conventional Aromatic Polyester Compounds lack Components (i) and (iii).

Component (i): Cyclic Anhydride Compound

Suitable cyclic anhydride compounds that may be used as Component (i) of the aromatic polyester polyol composition include one or more cyclic anhydride compounds comprising Structure (1), Structure (2), or combinations thereof.

Structure (1)

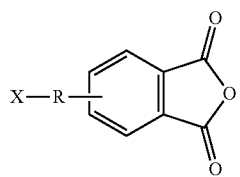

Structure (2)

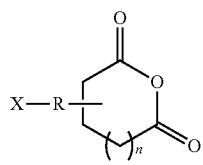

wherein X is a cyclic anhydride moiety, OH, or COOH, which attached directly to the structure or through R which is an aromatic ring, aliphatic ring, aliphatic chain radical each containing from 1 through 12 carbon atoms with or without alkyl branches, and with or without hetero atoms comprising, O, N, S etc. and n is an integer from 0 through 1.

Examples of suitable cyclic anhydrides that may be used as Component (i) include trimellitic anhydride, hemimellitic anhydride, pyromellitic dianhydride, mellophanic dianhydride, 3,3',4,4'-biphenyl tetracarboxylic dianhydride, 3-hydroxyphthalic anhydride, 4-hydroxyphthalic anhydride, bis (3,4-dicarboxyphenyl)ether dianhydride, 2,3,6,7-naphthalenetetracarboxylic dianhydride, cyclobutanetetracarboxylic dianhydride, carballylic anhydride, 3-hydroxynaphthalic anhydride, naphthalenetetracarboxylic anhydride, α-(2-carboxyethyl)glutaric anhydride.

In some embodiments, Component (i) comprises 1% to 68% (e.g., 3% to 20%) by weight of the total aromatic polyester polyol composition.

Component (ii): Phthalic Acid Based Compound

Examples of suitable phthalic acid based compounds that may be used as Component (ii) of the aromatic polyester polyol composition include one or more phthalic acid based compounds derived from: (a) substantially pure sources of the phthalic acid, such as phthalic anhydride, phthalic acid, isophthalic acid, terephthalic acid, 2,6-naphthalene dicarboxylic acid; methyl esters of phthalic, isophthalic, terephthalic acid, 2,6-naphthalene dicarboxylic acid; dimethyl terephthalate, polyethylene terephthalate, or combinations thereof; or (b) more complex ingredients such as the side stream, waste and/or scrap residues from the manufacture of phthalic acid, terephthalic acid, dimethyl terephthalate, polyethylene terephthalate, polybutylene terephthalate, polytrimethylene terephthalate, polyethylene naphthalate, or combinations thereof.

In some embodiments, Component (ii) comprises 1% to 70% (e.g., 1% to 50%, 2% to 40%) by weight of the total aromatic polyester polyol composition. Moreover, in certain embodiments, the weight ratio of Component (i) to Component (ii) ranges from 1:24 to 24:1 (e.g., 1:19 to 9:1 or 1:20 to 4:1).

Component (iii): Primary Amine Compound

Suitable primary amine compounds that may be used as Component (iii) of the aromatic polyester polyol composition include a primary amine compound comprising Structure (3).

$$NH_2-R-X$$ <span>Structure (3):</span> wherein X is —NH2, —OH or —COOH, and R is an aromatic ring, aliphatic ring, aliphatic chain radical each containing from 1 through 12 carbon atoms with or without alkyl branches, and with or without hetero atoms comprising, O, N, S, or combinations thereof.

Examples of suitable amines compounds that may be used as Component (iii) include diamines such as, ethylene diamine; 1,3 propane diamine; tetramethylene diamine; hexamethylene diamine; isophorone diamine; diaminodiphenylmethane; diaminodiphenylether; methylene-4 4'-cyclohexyl diamine; acetoguanamine; phenylene diamines, xylylene diamines; 1,2 cyclohexanediamine; 1,4 Cyclohexanediamine and mixtures thereof. Suitable amines can also include amino alcohols such as monoethanolamine; monopropanolamine, aminobenzylalcohol, aminophenylalcohol, hydroxyethylaniline and mixture thereof. Suitable amines can also include aminocarboxylic acids such as glycine; alanine, valine, aminopropionic acids, aminocaproic acid or amino benzoic acids and mixtures thereof.

In some embodiments, Component (iii) comprises 0.3% to 25% (e.g., 1% to 15%) by weight of the total aromatic polyester polyol composition.

Component (iv): Aliphatic Diol Compound

Suitable aliphatic diol compounds that may be used as Component (iv) of the aromatic polyester polyol composition include an aliphatic diol compound comprising Structure (4).

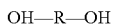 Structure (4):

wherein R is a divalent radical selected from the group comprising: (x) alkylene radicals comprising 2 to 12 carbon atoms, with or without alkyl branches; or (y) radicals of Structure (5).

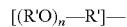 Structure (5):

wherein R' is an alkylene radical containing 2-4 carbon atoms and n is an integer from 1 to 10.

Examples of suitable aliphatic diol compounds that may be used as Component (iv) include ethylene glycol; diethylene glycol; propylene glycol; dipropylene glycol; trimethylene glycol; triethylene glycol; tetraethylene glycol; butylene glycols; 1,4 butanediol; neopentyl glycol; 2-methyl-2, 4-pentanediol; 1,6-hexanediol; 1,2-cyclohexanediol; poly (oxyalkylene)polyols each containing from two to four alkylene radicals derived by the condensation of ethylene oxide, propylene oxide, or combinations thereof.

In some embodiments, Component (iv) comprises 5% to 70% (e.g., 5% to 40%, 10% to 30%) by weight of the total aromatic polyester polyol composition.

Component (v): High Functionality, Low Molecular Weight Polyether Polyols

The reactive mixture used to form the Imide Moiety Containing Aromatic Polyol Compound can also comprise a high functionality (i.e., three or more active hydrogen atoms per molecule), low molecular weight (i.e., up to 1,000 Daltons) polyether polyol. Examples of suitable high functionality, low molecular weight polyether polyols include glycerin, alkoxylated glycerin, 1,1,1-trimethylolpropane, 1,1,1-trimethylolethane, pentaerythritol, dipentaerythritol, sucrose, alkoxylated sucrose, methyl glucoside, alkoxylated methyl glucoside, glucose, alkoxylated glucose, fructose, alkoxylated fructose, sorbitol, alkoxylated sorbitol, lactose, alkoxylated lactose, or combinations thereof.

In some embodiments, Component (v) comprises 0% to about 30% (e.g., 0% to 20%, 0% to 10%) by weight of the total aromatic polyester polyol composition.

Component (vi): Hydrophobic Compound

The reactive mixture used to form the Imide Moiety Containing Aromatic Polyol Compound can also comprise a hydrophobic compound. As used herein, "hydrophobic compound" means a compound or mixture of compounds comprising one or more substantially non-polar organic moiety. The hydrophobic compound is generally water insoluble and typically contains at least one functional group capable of being esterified or trans-esterified (e.g., a monocarboxylic acid group, a monocarboxylic acid ester group, a hydroxyl group, or combinations thereof). As used herein, "monocarboxylic acid group" and "monocarboxylic acid ester group" means that the carboxylic acid moieties present in the hydrophobic compound are monoacids.

In some embodiments, the hydrophobic compounds used as Component (vi) are non-phthalic acid derived materials.

Suitable hydrophobic compounds that may be used as Component (vi) include carboxylic acids (e.g., fatty acid compounds such as caproic, caprylic, 2-ethylhexanoic, capric, lauric, myristic, palmitic, stearic, oleic, linoleic, linolenic, and ricinoleic,), lower alkanol esters of carboxylic acids (e.g., fatty acid methyl esters compounds such as methyl caproate, methyl caprylate, methyl caprate, methyl laurate, methyl myristate, methyl palmitate, methyl oleate, methyl stearate, methyl linoleate, and methyl linolenate), fatty acid alkanolamides (e.g., tall oil fatty acid diethanolamide, lauric acid diethanolamide, and oleic acid monoethanolamide), triglycerides (e.g., fats and oils such as castor oil, coconut (including cochin) oil, corn oil, cottonseed oil, linseed oil, olive oil, palm oil, palm kernel oil, peanut oil, soybean oil, sunflower oil, tall oil, tallow, and derivatives of natural oil or functionalized, such as epoxidized, natural oil), alkyl alcohols (e.g., alcohols containing from 4 to 18 carbon atoms per molecule such as decyl alcohol, oleyl alcohol, cetyl alcohol, isodecyl alcohol, tridecyl alcohol, lauryl alcohol, and mixed $C_{12}$-$C_{14}$ alcohol), or combinations thereof.

In some embodiments, Component (vi) comprises 0% to 30% (e.g., 0% to 20%, 0% to 10%) by weight of the total aromatic polyester polyol composition.

Method of Making the Imide Moiety Containing Aromatic Polyol Compound

To make the Imide Moiety Containing Aromatic Polyol Compound, each of the components (i) to (iv) are placed in the same reaction vessel and subjected to esterification/transesterification reaction conditions. In certain embodiments, the optional reactive components described above are also added to the reaction vessel. The reaction conditions typically involve a temperature ranging from about 50° C. to about 300° C. (e.g., 70° C. to 250° C.), for a time period ranging from about 1 hour to about 24 hours (e.g., 3 hours to 10 hours).

In certain embodiments, a preformed aromatic polyester polyol formed from components (i) to (iv), the optional reactive components described above, and components (v) and (vi) are placed in the same reaction vessel and subjected to the esterification/transesterification reaction conditions described above thereby forming the Imide Moiety Containing Aromatic Polyol Compound.

In some embodiments, an esterification/transesterification catalyst may be employed to increase the rate of reaction. Examples of catalysts that may be employed include, but are not limited to, tin catalysts, titanium catalysts, alkali catalysts, acid catalysts, or enzymes. Suitable catalyst include: tin catalysts (e.g., Fastcat™ (tin oxide-based) catalysts available from Arkema, Inc.), titanium catalysts (e.g., Tyzor® TBT (titanium tetra-n-butoxide) catalysts; triethanolamine tianate chelate catalyst (e.g., Tyzor® TE available from Dorf Ketal Specialty Catalysts); alkali catalysts (e.g., NaOH, KOH, sodium and potassium alkoxides); and acid catalysts (.e., sulfuric acid, phosphoric acid, hydrochloric acid, and sulfonic acid). Typically, the catalyst is present from about 0.001% to about 0.2% by weight of the total aromatic polyester polyol composition.

After formation, the Imide Moiety Containing Aromatic Polyol Compound composition can comprise a minor amount of unreacted aliphatic diol. For example, in certain embodiments, the composition can comprise up to 30% by weight free aliphatic diol, based on the total weight of the composition. However, the free aliphatic diol content of the composition generally ranges from 0% to 20% by weight (e.g., 1% to 15%) based on the total weight of the composition.

It should be noted that in some embodiments, the aromatic polyester polyol composition is solvent-free. As used herein, "solvent-free" means that there are no solvents (e.g., acetone, tetrahydrofuran) present in the composition; provided, however, that in some instances that may be trace or incidental amounts of solvent (e.g., ≤5%, ≤3%, ≤1% by weight of the total aromatic polyester polyol composition) present in the composition.

The Imide Moiety Containing Aromatic Polyol Compound composition can also contain nonionic emulsifier (i.e., compounds that contain one or more hydrophobic moieties and one or more hydrophilic moieties and which have no moieties that dissociate in aqueous solution or dispersion into cations and anions). While nearly any nonionic emulsifier compound can be employed, in some embodiments, the nonionic emulsifier can be a polyoxyalkylene emulsifier which contains an average of from about 4 to about 200 individual oxyalkylene groups per molecule with the oxyalkylene groups typically being selected from the group consisting of oxyethylene and oxypropylene. Typically, the nonionic emulsifier can comprise, for example, from about 0% to about 20% by weight of the composition (e.g., 0% to about 10%).

Modifications

While specific embodiments of the present disclosure have been described in detail, it will be appreciated by those skilled in the art that various modifications and alternatives to those details could be developed considering the overall teachings of the disclosure. Accordingly, the arrangements disclosed are meant to be illustrative only and not limiting as to the scope of the disclosure which is to be given the full breadth of the claims appended and all equivalents thereof. Therefore, any of the features, properties, and/or elements which are listed above may be combined with one another in any combination and still be within the breadth of this disclosure.

Examples

Raw Material and Components:
The following reaction components, raw material and terms are referred to in the examples:
PTA: Purified terephthalic acid (available from Group Petrotemex, S.A. de C.V.).
DEG: Diethylene glycol (available from Equistar Chemicals, LP).
TEG: Triethylene glycol available from (Dow Chemical Company).
PEG 200: Polyethylene glycol 200 (available from Huntsman International LLC).
Glycerin (available from Terra Biochem LLC).
TYZOR® TE: Titanium (triethanolaminato)isopropoxide solution 80 wt. % in isopropanol (available from Dorf Ketal Specialty Catalysts LLC).
TMA: Trimellitic anhydride (1,2,4-Benzenetricarboxylic anhydride from Sigma Aldrich Corporation).
Glycine (available from Sigma Aldrich Corporation).
MDA: 4,4'-Diaminodiphenylmethane (available from Sigma Aldrich Corporation).
TEROL® 250: Aromatic polyester polyol having an OH value of 250 mg KOH/g (available from Huntsman International LLC).

Analysis and Testing:
The following terms are referred to in the examples:
Acid Value: A measurement of residue acid in polyester polyol determined by standard titration techniques, e.g. ASTM D4662.
OH Value: Hydroxyl value which is a measurement of the number of OH groups determined by standard titration techniques, e.g. ASTM D4274.
Viscosity: Viscosity measured using a Brookfield Viscometer, such as a Brookfield DV-II Viscometer.

TGA analysis: Thermogravimetric analysis (TGA) was run using TGA Q5000 from TA instruments-Water LLC. It is a method of thermal analysis in which the mass of a sample is measured over time as the temperature changes.
Cone calorimeter test: The test was conducted in accordance with the test method ASTM E1354-17 at a radiant heat intensity of 30 kW/m$^2$. The following parameters were recorded:
PHRR: Peak heat release rate, the highest rate of heat generation by fire.
THR: The total heat generated by fire at a certain time.
TSR: The total smoke generated by fire at a certain time.
ML %: Percentage of mass loss at a certain time during the fire.

Description of Polyol Synthesis
Polyol-1:
286 g of PTA, 73 g of trimellitic anhydride (TMA), 38 g of MDA, 11 g of glycerin, 73 g of PEG 200, 194 g of TEG, and 197 g of DEG was added to a 500 mL cylindrical glass reactor. Under a 0.3~0.5 liter per minute (LPM) flow of nitrogen, the reaction mixture was heated to 80° C. and maintained at that temperature for 30 minutes. The mixture was then heated to 140° C. and maintained at that temperature for 30 minutes before being heated to 246° C. The temperature was then maintained at 246° C. and the condensation water was collected. When the head temperature dropped below 70° C. (~2 hours later), 0.8 g of Tyzor TE was added. The reaction was then heated at 240° C. until the acid value was below 2.0 mg KOH/g (~3 hours). The reaction was cooled to below 100° C. and the Polyol-1 was collected. The OH value was measured and then DEG was added to adjust the OH value to the calculated 250 mg KOH/g while blending at 80° C. for 30 minutes. The polyol was then cooled to room temperature, and the final OH value and viscosity were measured.

Polyol-2:
273 g of PTA, 79 g of trimellitic anhydride (TMA), 31 g of glycine, 11 g of glycerin, 76 g of PEG 200, 202 g of TEG, and 205 g of DEG was added to a 500 mL cylindrical glass reactor. Under a 0.3~0.5 liter per minute (LPM) flow of nitrogen, the reaction mixture was heated to 80° C. and maintained at that temperature for 30 minutes. The mixture was then heated to 140° C. and maintained at that temperature for 30 minutes before being heated to 246° C. The temperature was maintained at 246° C. and the condensation water was collected. When the head temperature dropped below 70° C. (~3 hours later), 0.8 g of Tyzor TE was added. The reaction was then heated at 240° C. until the acid value is below 2.0 mg KOH/g (~5 hours). The reaction was cooled to below 100° C. and the Polyol-2 was collected. The OH value was measured and then DEG was added to adjust the OH value to the calculated 250 mg KOH/g while blending at 80° C. for 30 minutes. The polyol was then cooled to room temperature, and the final OH value and viscosity were measured.

Summary of the Polyol Properties:

TABLE 1

| Polyol | Acid Value (mg KOH/g) | OH Value (mg KOH/g) | Viscosity (cPs) | TMA to PTA weight ratio |
|---|---|---|---|---|
| Terol ® 250 | 1.2 | 250 | 5560 | 0 |
| Polyol-1 | 1.1 | 253 | 15,090 | 0.255 |
| Polyol-2 | 1.3 | 250 | 8,060 | 0.29 |

Polyol Thermal Stability Testing:

The thermal stability of the inventive Polyol-1, Polyol-2 and the comparative TEROL® 250 was evaluated using TGA under nitrogen and air respectively. TGA is a widely accepted analytical method that provide an indication of relative thermal stability for the material under consideration. All polyols were heated from 25° C. to 700° C. with a temperature raise rate of 10° C./min. Percent retention of foam weight at a given temperature relative to the foam's initial weight at 25° C. is summarized in Tables 2 and 3 below. As expected, in all cases, the greater the temperature, the greater the extent of polyol decomposition, and the lower the percent eight retention. The inventive Polyol-1 and Polyol-2 showed higher weight retention at all temperatures compared to the comparative TEROL® 250 polyol in both anaerobic and aerobic conditions. Higher weight retention at a given temperature in TGA suggests better thermal stability for Polyol-1 (wherein the ratio of TMA to PTA is 0.29) and Polyol-2 (wherein the ratio of TMA to PTA is 0.255) when compared to TEROL® 250 (wherein the ratio of TMA to PTA was zero).

TABLE 2

| | Weight % under nitrogen | | |
|---|---|---|---|
| Temp(° C.) | Terol ® 250 | Polyol-1 | Polyol-2 |
| 350 | 66.96 | 72.38 | 71.33 |
| 400 | 46.82 | 62.93 | 60.16 |
| 450 | 4.41 | 20.66 | 14.76 |
| 500 | 2.73 | 16.71 | 11.39 |
| 550 | 2.45 | 15.93 | 10.41 |
| 600 | 2.18 | 14.67 | 9.08 |

TABLE 3

| | Weight % under air | | |
|---|---|---|---|
| Temp(° C.) | Terol ® 250 | Polyol-1 | Polyol-2 |
| 350 | 33.53 | 64.98 | 60.34 |
| 400 | 18.21 | 48.64 | 41.87 |
| 450 | 5.61 | 21.89 | 14.08 |
| 500 | 3.09 | 16.36 | 9.10 |
| 550 | 0.10 | 4.78 | 0.67 |
| 600 | 0.03 | 0.03 | 0.14 |

What is claimed is:

1. A method for forming an aromatic polyester polyol compound comprising an imide moiety, wherein the method comprises reacting a reactive mixture comprising:

(i) a cyclic anhydride compound comprising Structure (1), Structure (2), or combinations thereof;

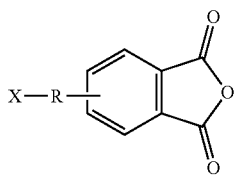

Structure (1)

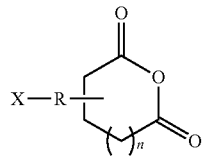

Structure (2)

wherein X is a cyclic anhydride moiety, OH, or COOH, which attached directly to the structure or through R which is an aromatic ring, aliphatic ring, aliphatic chain radical each containing from 1 through 12 carbon atoms with or without alkyl branches, and with or without hetero atoms comprising, O, N, S etc. and n is an integer from 0 through 1;

wherein Component (i) is present in an amount of 3% to 20% by weight based on a total weight of the reactive mixture;

(ii) a phthalic acid based compound, wherein Component (ii) is present in an amount of 2% to 40% by weight based on the total weight of the reactive mixture, (iii) a primary amine compound comprising Structure (3);

$NH_2$—R—X    Structure (3)

wherein X is —$NH_2$, —OH or —COOH, and R is an aromatic ring, aliphatic ring, aliphatic chain radical each containing from 1 through 12 carbon atoms with or without alkyl branches, and with or without hetero atoms comprising, O, N, S, or combinations thereof;

wherein Component (iii) is present in an amount of 1% to 15% by weight based on the total weight of the reactive mixture;

(iv) an aliphatic diol compound, wherein Component (iv) is present in an amount of 40% to 70% by weight based on the total weight of the reactive mixture;

(v) optionally, a high functionality, low molecular weight polyether polyol compound;

(vi) optionally, a hydrophobic compound; and wherein the weight ratio of Component (i) to Component (ii) is from 1:24 to 24:1; and wherein the aromatic polyester polyol is liquid at 25° C. and comprises a hydroxy value ranging from about 30 to about 600.

2. The method according to claim 1, wherein the viscosity of the aromatic polyester polyol compound ranges from about 200 to about 150,000 centipoises at 25° C.

3. The method according to claim 1, wherein the acid value of the aromatic polyester polyol compound ranges from about 0.1 mg of KOH/g to about 10 mg of KOH/g.

4. The method according to claim 1, wherein the method comprises reacting Components (i), (ii), (iii), and (iv) in a single pot synthesis process.

5. The method according to claim 1, wherein the reaction does not occur in the presence of a solvent.

6. The method according to claim 1, wherein the aromatic polyester polyol compound has a better thermal stability than a non-imide moiety containing aromatic polyester polyol compound having similar aromatic content, hydroxy number, functionality, and acid value.

7. An aromatic polyester polyol compound comprising an imide moiety, wherein the aromatic polyester polyol is the reaction product of a reactive mixture comprising:

(i) a cyclic anhydride compound comprising Structure (1), Structure (2), or combinations thereof;

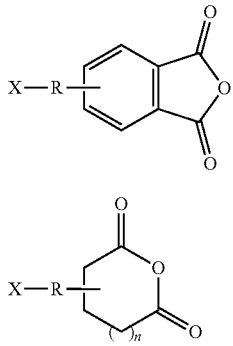

Structure (1)

Structure (2)

wherein X is a cyclic anhydride moiety, OH, or COOH, which attached directly to the structure or through R which is an aromatic ring, aliphatic ring, aliphatic chain radical each containing from 1 through 12 carbon atoms with or without alkyl branches, and with or without hetero atoms comprising, O, N, S etc. and n is an integer from 0 through 1;

wherein Component (i) is present in an amount of 3% to 20% by weight based on a total weight of the reactive mixture;

(ii) a phthalic acid based compound, wherein Component (ii) is present in an amount of 2% to 40% by weight based on the total weight of the reactive mixture, (iii) a primary amine compound comprising Structure (3);

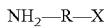 Structure (3)

wherein X is —NH2, —OH or —COOH, and R is an aromatic ring, aliphatic ring, aliphatic chain radical each containing from 1 through 12 carbon atoms with or without alkyl branches, and with or without hetero atoms comprising, O, N, S, or combinations thereof;

wherein Component (iii) is present in an amount of 1% to 15% by weight based on the total weight of the reactive mixture;

(iv) an aliphatic diol compound, wherein Component (iv) is present in an amount of 40% to 70% by weight based on the total weight of the reactive mixture;

(v) optionally, a high functionality, low molecular weight polyether polyol compound;

(vi) optionally, a hydrophobic compound; and wherein the weight ratio of Component (i) to Component (ii) is from 1:24 to 24:1; and wherein the aromatic polyester polyol is liquid at 25° C. and comprises a hydroxy value ranging from about 30 to about 600.

8. The aromatic polyester polyol compound according to claim 7, wherein the viscosity of the aromatic polyester polyol compound ranges from about 200 to about 150,000 centipoises at 25° C.

9. The aromatic polyester polyol compound according to claim 7, wherein the acid value of the aromatic polyester polyol compound ranges from about 0.1 mg of KOH/g to about 10 mg of KOH/g.

10. The aromatic polyester polyol compound according to claim 7, wherein the method comprises reacting Components (i), (ii), (iii), and (iv) in a single pot synthesis process.

11. The aromatic polyester polyol compound according to claim 7, wherein the reaction does not occur in the presence of a solvent.

12. The aromatic polyester polyol compound according to claim 7, wherein the aromatic polyester polyol compound has a better thermal stability than a non-imide moiety containing aromatic polyester polyol compound having similar aromatic content, hydroxy number, functionality, and acid value.

13. The method according to claim 1, wherein Component (v) is present in the reaction mixture.

14. The method according to claim 1, wherein Component (vi) is present in the reaction mixture.

15. The method according to claim 1, wherein Component (v) and Component (vi) are present in the reaction mixture.

* * * * *